(12) United States Patent
Rao

(10) Patent No.: US 7,739,486 B2
(45) Date of Patent: *Jun. 15, 2010

(54) ELECTRONIC DEVICE SUPPORTING MULTIPLE UPDATE AGENTS

(75) Inventor: Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1459 days.

This patent is subject to a terminal disclaimer.

(21) Appl. No.: 11/083,596

(22) Filed: Mar. 18, 2005

(65) Prior Publication Data

US 2005/0216718 A1 Sep. 29, 2005

Related U.S. Application Data

(63) Continuation of application No. 10/765,817, filed on Jan. 27, 2004, now Pat. No. 6,941,453.

(60) Provisional application No. 60/446,494, filed on Feb. 11, 2003.

(51) Int. Cl.
G06F 9/00 (2006.01)
G06F 9/24 (2006.01)
G06F 9/44 (2006.01)
G06F 9/445 (2006.01)

(52) U.S. Cl. .............. 713/1; 713/2; 717/168; 717/171; 717/172; 717/173

(58) Field of Classification Search ........ 713/1, 713/2; 707/168–178
See application file for complete search history.

(56) References Cited

U.S. PATENT DOCUMENTS 5,261,055 A 11/1993 Moran et al.
5,442,771 A 8/1995 Filepp et al.

(Continued)

FOREIGN PATENT DOCUMENTS

CA 2339923 A 3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Mark Connolly

(57) ABSTRACT

Disclosed herein is a method for updating at least one of firmware, software, device components, and device configuration in an electronic device. The method and apparatus may employ at least one update agent or a plurality of update agents. An electronic device supporting multiple update agents may be adapted to prompt and facilitate an end-user to select at least one of the update agents to process update information contained in at least one update. The electronic device may also be adapted to prompt and facilitate an end-user to apply a particular update agent to update at least one of firmware, software, device components, device configuration, device information, and device parameters. The electronic device may also be adapted to prompt and facilitate an end-user to select an appropriate update agent from a plurality of available update agents based upon some information, such as for example, the type of update that the update agent is adapted to perform.

26 Claims, 4 Drawing Sheets

U.S. PATENT DOCUMENTS

| | | | |
|---|---|---|---|
| 5,479,637 A | 12/1995 | Lisimaque et al. | |
| 5,579,522 A | 11/1996 | Christeson et al. | |
| 5,596,738 A | 1/1997 | Pope | |
| 5,598,534 A | 1/1997 | Haas | |
| 5,608,910 A | 3/1997 | Shimakura | |
| 5,623,604 A | 4/1997 | Russell et al. | |
| 5,666,293 A | 9/1997 | Metz et al. | |
| 5,752,039 A | 5/1998 | Tanimura | |
| 5,778,440 A | 7/1998 | Yiu et al. | |
| 5,790,974 A | 8/1998 | Tognazzini | |
| 5,878,256 A | 3/1999 | Bealkowski et al. | |
| 5,960,445 A | 9/1999 | Tamori et al. | |
| 6,009,497 A | 12/1999 | Wells et al. | |
| 6,038,636 A | 3/2000 | Brown, III et al. | |
| 6,064,814 A | 5/2000 | Capriles et al. | |
| 6,073,206 A | 6/2000 | Piwonka et al. | |
| 6,073,214 A | 6/2000 | Fawcett | |
| 6,088,759 A | 7/2000 | Hasbun et al. | |
| 6,105,063 A | 8/2000 | Hayes, Jr. | |
| 6,112,024 A | 8/2000 | Almond et al. | |
| 6,112,197 A | 8/2000 | Chatterjee et al. | |
| 6,126,327 A | 10/2000 | Bi et al. | |
| 6,128,695 A | 10/2000 | Estakhri et al. | |
| 6,157,559 A | 12/2000 | Yoo | |
| 6,163,274 A | 12/2000 | Lindgren | |
| 6,198,946 B1 | 3/2001 | Shin et al. | |
| 6,199,204 B1* | 3/2001 | Donohue | 717/178 |
| 6,279,153 B1 | 8/2001 | Bi et al. | |
| 6,311,322 B1 | 10/2001 | Ikeda et al. | |
| 6,438,585 B2 | 8/2002 | Mousseau et al. | |
| 6,941,453 B2* | 9/2005 | Rao | 713/2 |
| 7,055,148 B2* | 5/2006 | Marsh et al. | 717/172 |
| 7,293,115 B2* | 11/2007 | DaCosta et al. | 710/8 |
| 7,376,944 B2* | 5/2008 | Crisan et al. | 717/171 |
| 2001/0029178 A1 | 10/2001 | Criss et al. | |
| 2001/0047363 A1 | 11/2001 | Peng | |
| 2001/0048728 A1 | 12/2001 | Peng | |
| 2002/0078209 A1 | 6/2002 | Peng | |
| 2002/0116261 A1 | 8/2002 | Moskowitz et al. | |
| 2002/0131404 A1 | 9/2002 | Mehta et al. | |
| 2002/0152005 A1 | 10/2002 | Bagnordi | |
| 2002/0156863 A1 | 10/2002 | Peng | |
| 2002/0157090 A1 | 10/2002 | Anton, Jr. | |
| 2002/0184619 A1* | 12/2002 | Meyerson | 717/173 |
| 2003/0033599 A1 | 2/2003 | Rajaram et al. | |
| 2003/0037075 A1 | 2/2003 | Hannigan et al. | |
| 2003/0061384 A1 | 3/2003 | Nakatani | |
| 2004/0226008 A1* | 11/2004 | Jacobi et al. | 717/168 |
| 2004/0243992 A1* | 12/2004 | Gustafson et al. | 717/168 |
| 2005/0216718 A1* | 9/2005 | Rao | 713/1 |
| 2005/0268296 A1* | 12/2005 | Marolia et al. | 717/168 |

FOREIGN PATENT DOCUMENTS

| | | |
|---|---|---|
| JP | 8202626 A | 8/1996 |
| KR | 2002-0034228 A1 | 5/2000 |
| KR | 2001-0100328 A1 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

Bettini, Lorenzo, "Software Update via Mobile Agent Based Programming", 2002 ACM.

"Generic Content Download Over the Air Specification" Version 1.0.

"System Firmware Update Method Before Rebooting the Operating System".

* cited by examiner

ELECTRONIC DEVICE SUPPORTING MULTIPLE UPDATE AGENTS

CROSS-REFERENCE TO OTHER APPLICATIONS

This application is a continuation of prior U. S. Patent application Ser. No. 10/765,817 entitled "MOBILE HANDSET WITH SUPPORT FOR MULTIPLE UPDATE AGENTS", filed Jan. 27, 2004, now U.S. Pat. No. 6,941,453, which claims the benefit of U.S. Provisional Application Ser. No. 60/446,494, entitled "MOBILE HANDSET WITH SUPPORT FOR MULTIPLE UPDATE AGENTS", filed Feb. 11, 2003, the complete subject matter of each of which is hereby incorporated herein by reference, in its entirety.

The present application also hereby incorporates herein by reference the complete subject matter of PCT Application having publication number WO 02/41147 A1, and having application number PCT/US01/44034, filed on Nov. 19, 2001, in its entirety.

The present application also hereby incorporates herein by reference the complete subject matter of U.S. Provisional Patent Application having Ser. No. 60/249,606, filed Nov. 17, 2000 in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices (i.e., mobile electronic devices having software/firmware), for example, mobile cellular phones, personal digital assistants (PDA's), pagers, MP3 players, digital cameras, etc. often contain firmware and/or application software that are either provided by the manufacturers of the electronic devices, telecommunication carriers, or third parties. These firmware and application software often contain bugs. New versions (updates) of the firmware and software are periodically released to fix the bugs, introduce new features, or both.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

An electronic device comprising a plurality of update agents and method for operating said device, substantially as shown in and/or described in connection with at least one of the figures, as set forth more completely in the claims.

DETAILED DESCRIPTION OF THE DRAWINGS

Figure 1:
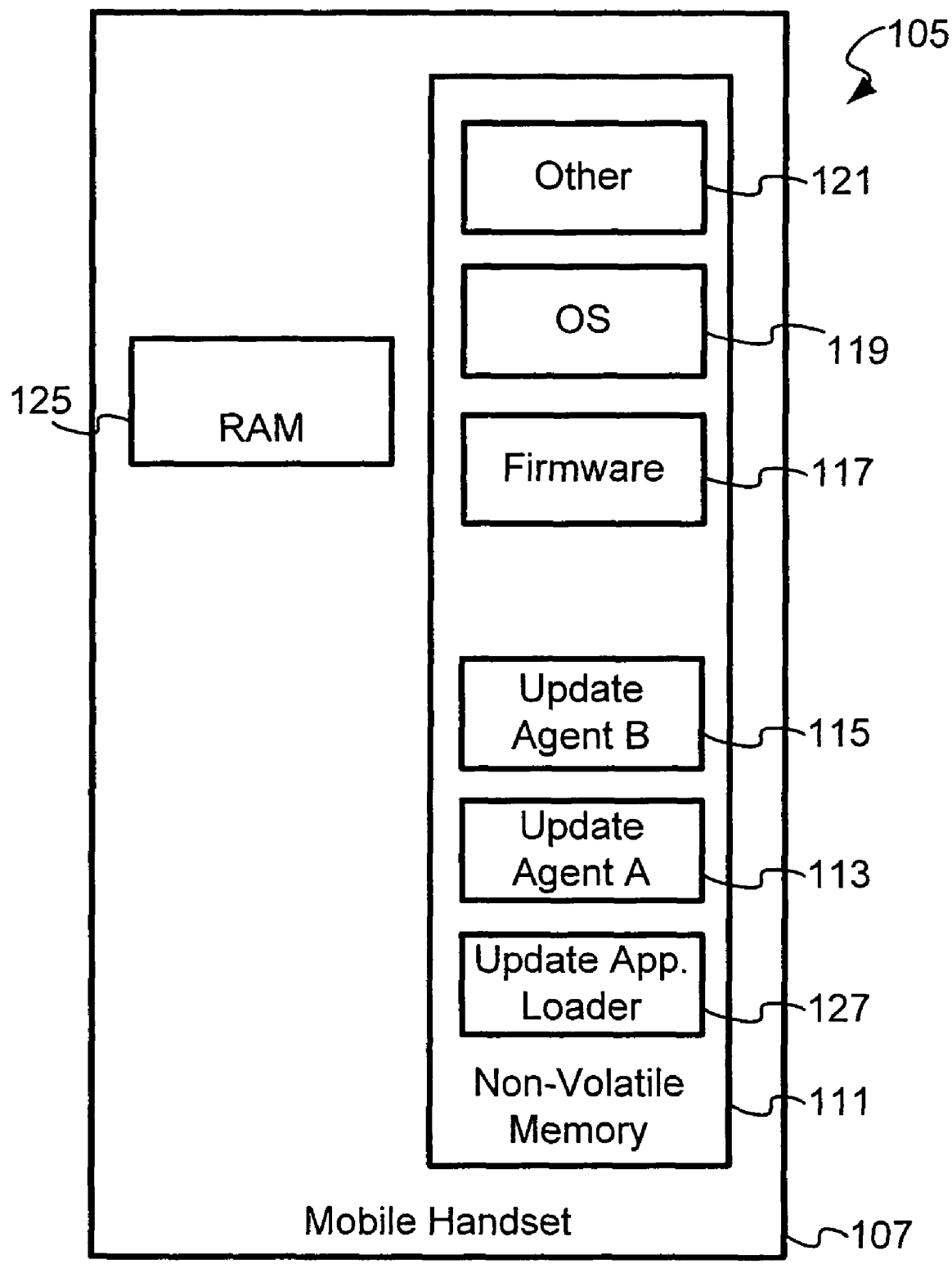
FIG. 1 is a block diagram illustrating an electronic device capable of employing at least one of several available update agents to update at least one of software and firmware according to an embodiment of the present invention.

FIG. 1 is a block diagram 105 illustrating an electronic device capable of employing at least one of several available update agents to update at least one of software and firmware according to an embodiment of the present invention. An electronic device may be for example, a mobile electronic device having software/firmware, such as, mobile cellular phone handsets, personal digital assistants (PDA's), pagers, MP3 players, digital cameras, etc.

An electronic device, for example mobile handset 107, may be capable of employing one of several available update agents to update at least one of software and firmware in the mobile handset 107. An update agent may be a device or software application that is capable of updating firmware, an operating system, or other application software, etc. An update agent may also be adapted to interact with one or more memory devices. The electronic device may comprise random access memory (RAM) 125 and non-volatile memory 111. The non-volatile memory 111 may comprise a plurality of software components, such as for example, update application loader 127, update agent A 113, update agent B 115, firmware 117, operating system (OS) software 119, and other components 121. In a representative embodiment of the present invention, an update package (that may be referred to herein as update information) may comprise a plurality of transformation instructions which transform a first code version into a second code version. In one aspect, the instruction set utilizes a conversion process employed by a client device such as, for example, the mobile handset 107 to efficiently convert an existing the first code version to the second code version.

In a representative embodiment of the present invention, an update generator may produce an update package comprising an instruction set which represents a plurality of operations that are desirably used to transform a first original code version into a second updated code version. The update package (that may also be referred herein as update information) may then be transferred to a client device such as, for example, the mobile handset 107 via a communications medium. Viable communications media may include hardwired media, removable storage media, wireless media, volatile and non-volatile memory based media, and the Internet. Other communications media may include by way of example, local area networks (LANs), wide area networks (WANs), public Internets, private Internets, a private computer network, a secure Internet, a private network, a public network, a value-added network, interactive television networks, wireless data transmission networks, two-way cable networks, interactive kiosk networks, and the like. In addition, the client device may comprise numerous types of devices capable of receiving and processing the update package/update information, such as computers, personal digital assistants (PDAs), hardwired phones, mobile phones (e.g., mobile handset), pagers, electronic peripheral devices, appliances, and other such devices capable of being configured to receive the update package.

The electronic device may be capable of employing an update agent to update firmware 117, OS software 119, or other components 121. The electronic device may employ more than one update agent, if necessary. The electronic device may be capable of displaying a list of available update agents to an end-user to solicit or prompt the end-user to select a specific update. An update may comprise firmware/software updates that modify or change the version of a particular firmware/software, for example, upgrading to a newer version. An update may also add new services to the electronic device or delete services, as desired by the service provider or an end-user. The electronic device may be capable of invoking an appropriate update agent based upon the update content or characteristics. The electronic device may also be capable of rebooting the electronic device, after update completion, as necessary.

In an embodiment according to the present invention, the electronic device may detect the need to update at least one of firmware and software during power up or reboot. The electronic device may also display a list of available update agents to the end-user. Each of the update agents may correspond to a list of available updates or a single update. The electronic device may prompt the end-user to select at least one of the update agents/updates for update processing.

During power-up or reboot, the electronic device may execute update application loader 127. Update application loader 127 may invoke boot initialization code before determining whether the electronic device needs to be updated. The update application loader 127 may also determine a list of available update agents in the electronic device for performing a particular update. For the exemplary mobile handset 107 of FIG. 1, the list of update agents may contain at least a reference to, for example, update agent A 113 and update agent B 115, and may be displayed to the end-user. The end-user may select at least one of the update agents displayed. The selected update agent may be employed to update at least one of firmware, software, and device components or configuration in the electronic device. The update application loader 127 may also invoke the selected update agent, such as for example, update agent A 113, and transfer control to the selected update agent.

In an embodiment according to the present invention, during power-up or reboot, the electronic device may execute the update application loader 127 after invoking the boot initialization code. The update application loader 127 may determine the appropriate update agent to invoke from among a plurality of available update agents, such as, for example, update agent A 113 and update agent B 115, based upon the type of update selected or displayed for selection, or based upon the particular characteristics of the update selected or displayed for selection. The name of the update, or a sub-component of the name of the update, may provide sufficient information and be used by update application loader 127 to determine at least one of a plurality of available update agents which may be invoked to update at least one of firmware, software, and configuration, etc. of the electronic device.

In an embodiment according to the present invention, update agent A 113 for example, may be employed to update firmware 117 and operating system 119. The device may be rebooted, after update completion. Update agent B 115, for example, may be used to update other components 121, such as for example, configuration parameters, gaming engines, third-party software, etc. There may not be a need to reboot the electronic device after updating these types of components.

Figure 2:
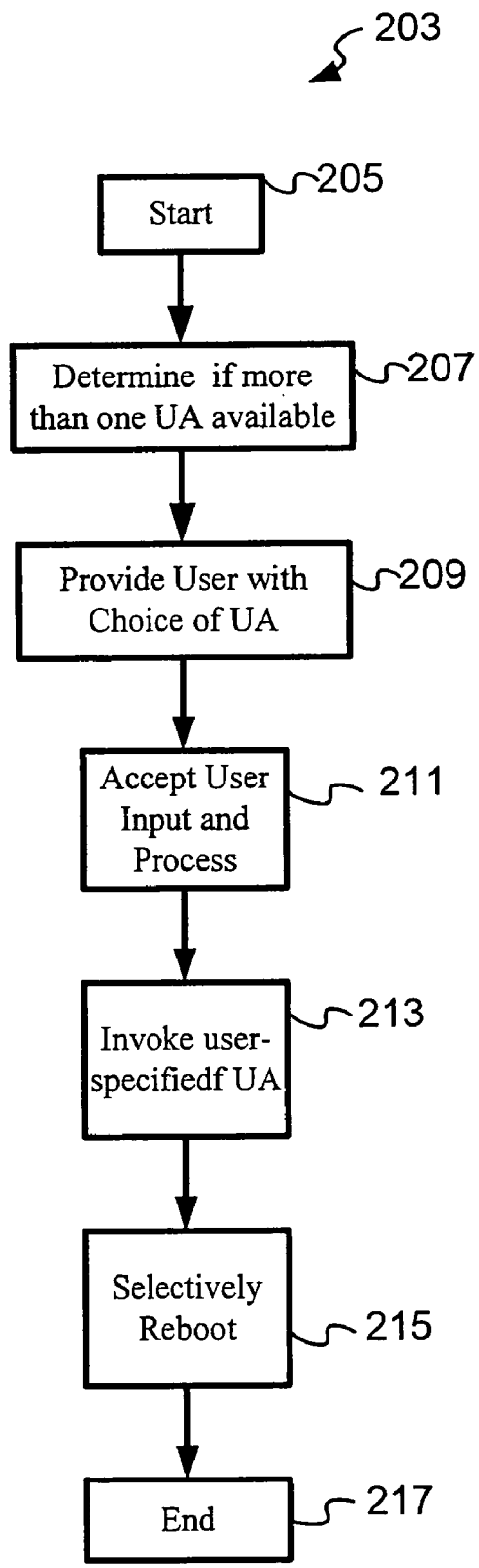
FIG. 2 is a flow chart illustrating an exemplary operation of the electronic device according to an embodiment of the present invention.

FIG. 2 is a flow chart 203 illustrating an exemplary method of operating an electronic device, such as, for example, the mobile handset 107 of FIG. 1, according to an embodiment of the present invention. The following description of FIG. 2 makes reference to elements illustrated in FIG. 1. FIG. 2 illustrates an embodiment wherein an end-user may be provided an opportunity, or be prompted, to select at least one of a plurality of available update agents to apply update information by employing at least one available update. Processing is initiated 205 when the electronic device is rebooted or powered-up and the update application loader 127 is executed 206 and invokes the boot initialization code. The update application loader 127 may also determine update necessity.

The update application loader 127 may then determine if more than one update agent is available (block 207) and assemble a displayable list of update agent names. The displayable list of update agent names may be displayed and the end-user may be prompted to select at least one of the available update agents to perform an update (block 209). The end-user's selection may be processed to determine and accept the update agent selected by the end-user (block 211).

The selected update agent, such as for example, update agent A 113 of FIG. 1, may be invoked (block 213). The update agent selected may access one or more updates and update at least one of firmware, software, configuration parameters, other components 121, etc., in the electronic device. The electronic device may be rebooted. For example, if the firmware 117 or operating system 119 has been updated, a reboot may be determined to be necessary. In an embodiment according to the present invention, if the other components 121 are updated, such as configuration parameters, third-party software, etc., then reboot of the electronic device may be determined to be unnecessary. Update related processing ends (block 217) and normal operation of the electronic device resumes or commences.

Figure 3:
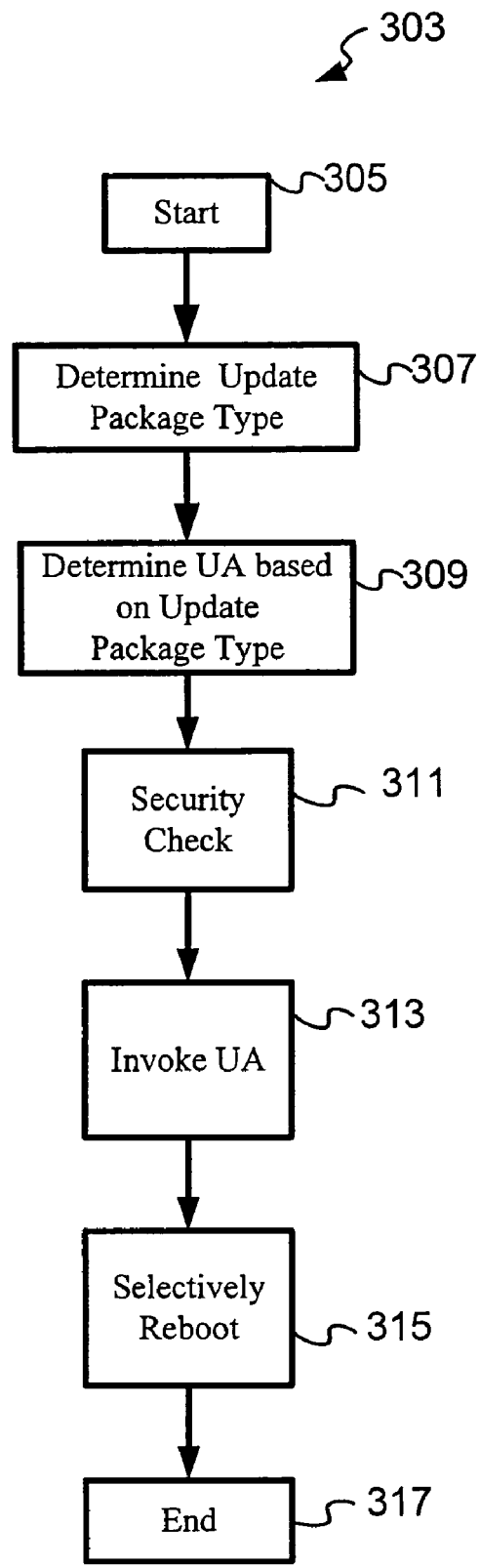
FIG. 3 is a flow chart illustrating an exemplary operation of the electronic device according to an embodiment of the present invention.

FIG. 3 is a flow chart 303 illustrating another exemplary method of operating an electronic device according to an embodiment of the present invention. The following description of FIG. 3 makes reference to elements illustrated in FIG. 1. The electronic device, for example mobile handset 107, may select at least one of a plurality of available update agents to apply one or more available updates. Processing is initiated (block 305) when the electronic device is rebooted or powered up, update application loader 127 is executed, and boot initialization code determines that an update is necessary.

The update application loader 127 may determine if more than one update agent is available and may also determine the type of the update to be performed (block 307). The update application loader 127 may determine which of the plurality of available update agents are adapted to process and apply the particular update type (block 309). In an embodiment according to the present invention, the name of the update or portions of the name of the update may be employed to determine which of the plurality of available update agents may be employed to process the update.

In an embodiment according to the present invention, a table of update agents may be maintained, wherein the table may map update types to corresponding update agents. The table may also be used to determine an appropriate one of the multiple update agents adapted to process the update.

A security check may be conducted to determine whether the update agent selected is permitted to update sections of non-volatile memory associated with a particular corresponding update (block 311). The selected update agent may be invoked, select one or more updates, and apply the corresponding updates (block 313). The electronic device may be rebooted (block 315). If firmware 117 or operating system software 119 has been updated, a reboot may be determined to be necessary. In an embodiment according to the present invention, however, if other components 121 are updated, such as for example, configuration parameters, a third-party software, etc. then reboot of the electronic device may be determined to be unnecessary. Update related processing ends (block 317) and normal operation of the electronic device resumes or commences.

Figure 4A:
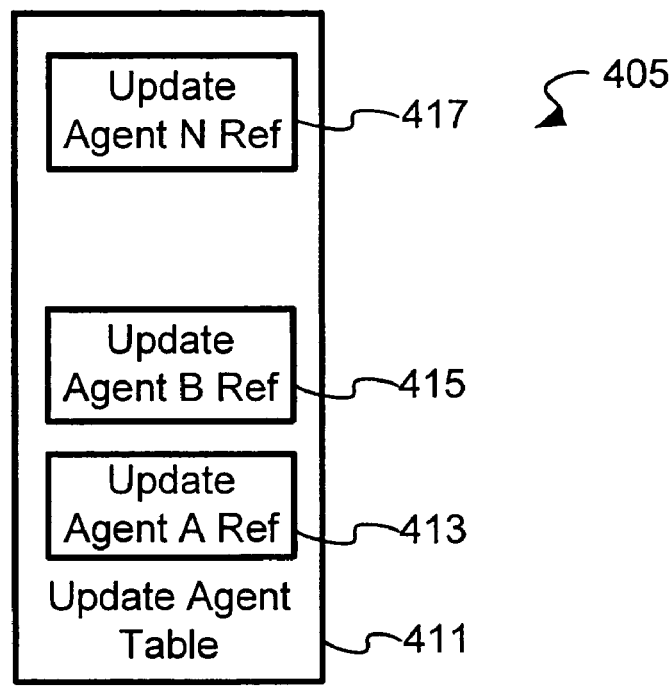
FIG. 4A is a block diagram illustrating an exemplary update agent table located in non-volatile memory of an electronic device according to an embodiment of the present invention.

FIG. 4A is a block diagram 405 illustrating an exemplary update agent table 411 located in non-volatile memory of an electronic device according to an embodiment of the present invention. The following description of FIG. 4A makes reference to elements illustrated in FIG. 1. The update agent table 411 may contain references to a plurality of update agents currently available in the electronic device, for example mobile handset 107. The update agent table 411 may also comprise references to the location of a plurality of update agents, such as for example, update agent A reference 413 and update agent B reference 415, for update agents such as, update agent A 113 and update agent B 115 of FIG. 1, located in non-volatile memory 111, respectively. When the electronic device determines which update agent should be invoked, the electronic device may obtain a reference to the selected update agent by employing update agent table 411, and subsequently invoking the selected update agent. When a new update agent is incorporated into the electronic device, a new entry may be added to the update agent table 411. The update agent table 411 may also be managed in terms of adding new entries and deleting old entries, etc., for example.

Figure 4B:
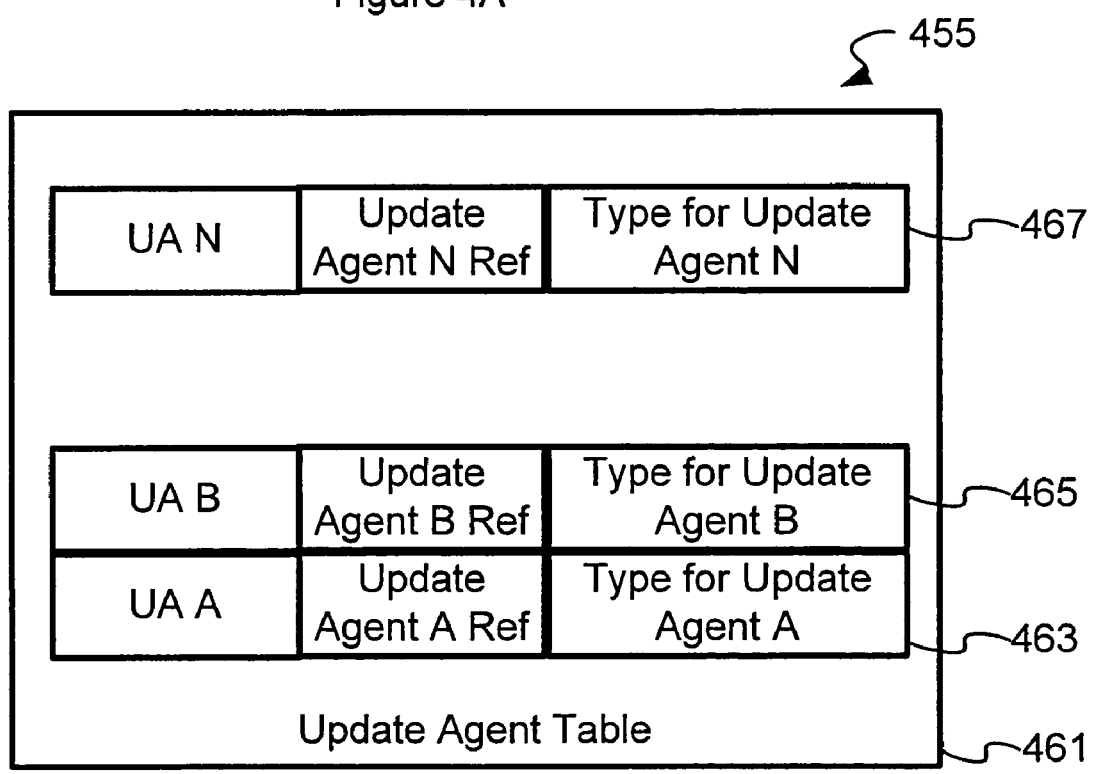
FIG. 4B is a block diagram illustrating an exemplary update agent table located in a non-volatile memory of an electronic device according to an embodiment of the present invention.

FIG. 4B is a block diagram 455 illustrating another exemplary update agent table 461 located in non-volatile memory of an electronic device according to an embodiment of the present invention. The following description of FIG. 4B makes reference to elements illustrated in FIG. 1. The update agent table 461 may contain references to a plurality of update agents currently available in the electronic device, for example, mobile handset 107. The update agent table 461 may also maintain mapping between update agent names, the update agent corresponding address location (i.e., where the update agent is located in non-volatile memory), and the type of update(s) that the update agent is adapted to process, for all of the available update agents in the electronic device. For example, an entry 463 in update agent table 461 may provide mapping between the update agent name 'UA A', the address location 'Update Agent A ref', and the type of update(s) the update agent is adapted to process. The type information may be provided as 'file extensions' in an embodiment according to the present invention. For example, the file extension 'dup' may correspond to updates generated by an update application generator. An update application generator may be adapted to determine appropriate update(s) for an electronic device. The type field in each entry in the update agent table 461 may also be a list of file extensions that the update agent is adapted to process in an embodiment according to the present invention.

Other structures and schemas are also contemplated for update agent table 461. An update agent table 461 may map the name of an update agent to the location where the update agent resides in memory, and also to the type of update(s) the update agent is adapted to process, as described above. An electronic device supporting multiple update agents may prompt and facilitate an end-user in selecting at least one update agent for processing a particular update(s). The electronic device may also subsequently apply an update to at least one of firmware, software, or device configuration, etc. in the electronic device The electronic device may also prompt and facilitate an end-user in selecting an appropriate update agent from a plurality of available update agents based upon update information, such as for example, the type of update(s) that the update agent may be adapted to perform.

Aspects of the present invention may be found in a method of updating at least one of firmware and software in an electronic device comprising a plurality of update agents. The method may comprise displaying a list of available update agents to an end-user. The update agents may be associated with at least one update. The method may also comprise prompting the end-user to select an update agent, invoking the selected update agent based upon information corresponding to a particular update, and performing the particular update.

In an embodiment according to the present invention, the method may further comprise rebooting the electronic device after update completion.

In an embodiment according to the present invention, the method may further comprise one of resuming and commencing characteristic electronic device operation after update completion.

In an embodiment according to the present invention, the method may further comprise detecting a need to update at least one of firmware, software, device components, and device configuration during one of power-up and reboot.

In an embodiment according to the present invention, the method may further comprise displaying a list of available updates. The plurality of update agents may each be adapted to process particular updates. Prompting an end-user to select a particular update agent may correspond to prompting an end-user to apply a particular update.

In an embodiment according to the present invention, the method may further comprise executing an update application loader, invoking a boot initialization code, determining a list of available update agents and corresponding updates, and determining whether the electronic device needs to be updated by evaluating the list of available update agents and corresponding updates.

In an embodiment according to the present invention, the method may further comprise determining an update agent to invoke from among a plurality of available update agents based upon at least one of an update type, a name of an update, and a sub-component of a name of an update, to update at least one of firmware, software, device components, and device configuration of the electronic device.

In an embodiment according to the present invention, the method may further comprise maintaining a table of update agents in the electronic device. The table of update agents maps update types to corresponding update agents. The method may also comprise employing the table of update agents to determine an update agent adapted to process a particular update, and employing the determined update agent to process the particular update.

In an embodiment according to the present invention, the method may further comprise conducting a security check to determine whether a selected update agent is permitted to update sections of non-volatile memory associated with a particular update.

In an embodiment according to the present invention, the method may further comprise selecting at least one update agent adapted to process a plurality of available updates, and applying the available updates using the selected at least one update agent.

In an embodiment according to the present invention, the method may further comprise maintaining an update agent table. The update agent table may comprise at least one of names of a plurality of update agents available in the electronic device, references to the plurality of update agents, and references to locations of the plurality of update agents.

In an embodiment according to the present invention, the method may further comprise determining an update agent to perform an update, obtaining a reference to the update agent by evaluating an update agent table, and performing at least one update associated with the update agent.

In an embodiment according to the present invention, the method may further comprise maintaining a table of update agents. The table of update agents may comprise entries providing information corresponding to update agents and associated updates available in the electronic device.

In an embodiment according to the present invention, the method may further comprise maintaining an update agent table comprising references to a plurality of update agents in the electronic device. The update agent table may map at least one of update agent names, update agent address locations, type information corresponding to updates that particular update agents are adapted to process, and availability of particular update agents.

In an embodiment according to the present invention, type information may further comprise at least one of a file extension corresponding to a particular update that an update agent is adapted to process and a list of file extensions corresponding to a plurality of updates that an update agent is adapted to process.

In an embodiment according to the present invention, the electronic device may comprise one of a mobile cellular phone handset, a personal digital assistant, a pager, an MP3 player, and a digital camera.

Aspects of the present invention may be found in an electronic device comprising a plurality of update agents in non-volatile memory. Each of the update agents may be adapted to update at least one of firmware, software, device configuration, and device components. The electronic device may also comprise random access memory, and an update application loader.

In an embodiment according to the present invention, the electronic device may be adapted to display a list of available update agents from the plurality of update agents in non-volatile memory in the electronic device to an end-user, prompt the end-user to select an update agent, invoke the selected update agent based upon information corresponding to a particular update, and performing the particular update.

In an embodiment according to the present invention, the electronic device may be adapted to reboot after update completion.

In an embodiment according to the present invention, the electronic device may be adapted to one of resume and commence characteristic electronic device operation after update completion.

In an embodiment according to the present invention, the electronic device may be adapted to detect a need to update at least one of firmware, software, device configuration, and device components during one of power-up and reboot.

In an embodiment according to the present invention, the electronic device may be adapted to display a list of available updates. Each of the plurality of update agents may be adapted to process a particular update. An end-user may be prompted to select a particular update agent. Selecting a particular update agent may correspond to selecting a particular update.

In an embodiment according to the present invention, the electronic device may be adapted to execute an update application loader during one of power-up and reboot, invoke a boot initialization code, determine a list of available update agents and corresponding updates, and determine whether the electronic device needs to be updated by evaluating the list of available update agents and corresponding updates.

In an embodiment according to the present invention, the electronic device may be adapted to determine an update agent to invoke from among a plurality of available update agents based upon at least one of an update type, a name of an update, and a sub-component of a name of an update, to update at least one of firmware, software, device components, and device configuration of the electronic device.

In an embodiment according to the present invention, the electronic device may be adapted to maintain a table of update agents in the electronic device. The table of update agents may map update types to corresponding update agents. The electronic device may also be adapted to employ the table of update agents to determine an update agent adapted to process a particular update and to employ the determined update agent to process the particular update.

In an embodiment according to the present invention, the electronic device may be adapted to conduct a security check to determine whether a selected update agent is permitted to update sections of non-volatile memory associated with a particular update.

In an embodiment according to the present invention, the electronic device may be adapted to determine an update agent adapted to process a plurality of available updates and apply the available updates.

In an embodiment according to the present invention, the electronic device may be adapted to maintain an update agent table. The update agent table may comprise at least one of names of a plurality of update agents available in the electronic device, references to the plurality of update agents, and references to locations of the plurality of update agents.

In an embodiment according to the present invention, the electronic device may be adapted to determine an update agent to perform an update, obtain a reference to the update agent by evaluating an update agent table, invoke the update agent, and perform at least one update associated with the update agent.

In an embodiment according to the present invention, the electronic device may be adapted to maintain a table of update agents. The table of update agents may comprise entries providing information corresponding to update agents and associated updates available in the electronic device.

In an embodiment according to the present invention, the electronic device may be adapted to maintain an update agent table comprising references to a plurality of update agents in the electronic device. The update agent table may map at least one of update agent names, update agent address locations, type information corresponding to updates that particular update agents are adapted to process, and availability of particular update agents.

In an embodiment according to the present invention, type information may further comprise at least one of a file extension corresponding to a particular update that an update agent is adapted to process and a list of file extensions corresponding to a plurality of updates that an update agent is adapted to process.

In an embodiment according to the present invention, the electronic device may comprise one of a mobile cellular phone handset, a personal digital assistant, a pager, an MP3 player, and a digital camera.

Aspects of the present invention may be found in a mobile electronic device comprising an update application loader and a boot initialization code. The update application loader may be adapted to be executed at one of startup and reboot. The update application loader may also be adapted to invoke the boot initialization code, determine whether the mobile electronic device needs to be updated, locate an update agent, and invoke the located update agent to update at least one of firmware and software in the mobile electronic device.

In an embodiment according to the present invention, the located update agent may be an application. The update application loader may invoke the located update agent after determining that at least one of firmware and software needs to be updated.

In an embodiment according to the present invention, the update application loader may be adapted to invoke a located update agent and be updated by the located update agent.

In an embodiment according to the present invention, performing an update may comprise installing a second update agent. The mobile electronic device may be adapted to invoke a first update agent to perform the update installing the second update agent in the mobile electronic device.

In an embodiment according to the present invention, the update application loader may be adapted to be updated to a new version by invoking an update agent to update the update application loader.

Aspects of the present invention may be found in a mobile electronic device comprising a boot initialization code and an update application loader. The mobile electronic device, during at least one of reboot and power up, may be adapted to execute the boot initialization code. The update application loader may also be adapted to determine whether the mobile electronic device needs to be updated. The update application loader may be adapted to employ at least one of a plurality of update agents, each of the update agents comprising at least one associated update. The update application loader may also be adapted to determine an update agent to perform the at least one associated update and select the update agent from among the plurality of available update agents.

In an embodiment according to the present invention, the update application loader may be adapted to select at least one of the plurality of available update agents based upon at least one of a type of update the update agent is adapted to perform and a particular characteristic associated with a particular update.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and the appended diagrams. It is intended that the scope of the invention be limited not with this detailed description, but rather by the claims appended hereto.

What is claimed is:

1. A method of operating an electronic device comprising non-volatile memory containing a plurality of update agents capable of updating memory in the electronic device, each update agent capable of processing an associated type of update information, the method comprising:
    invoking boot initialization code in the electronic device;
    before the electronic device begins normal operation:
        determining whether update information is present in the electronic device;
        selecting from the plurality of update agents based upon identified update information; and
        performing an update of at least one of: software and firmware, using the selected update agent and the update information; and
    commencing normal operation of the electronic device.

2. The method according to claim 1, wherein the selecting is based upon input from a user of the electronic device.

3. The method according to claim 2, wherein the selecting comprises:
    prompting a user to identify update information; and
    receiving, from the user, an identification of update information.

4. The method according to claim 1, wherein the electronic device comprises a wireless mobile device.

5. The method according to claim 4, wherein the wireless mobile device comprises a cellular phone.

6. The method according to claim 1, wherein a mapping of a type of update information and at least one update agent associated with the type of update information is maintained in the non-volatile memory of the electronic device.

7. The method according to claim 6, wherein the mapping of a type of update information and at least one update agent associated with the type of update information associates:
    the type of update information;
    an update agent name; and
    an address in non-volatile memory where an update agent capable of processing update information of the associated type is located.

8. The method according to claim 1, wherein update information comprises a set of executable instructions for converting a first code version to a second code version.

9. The method according to claim 1, wherein the update information comprises an update package.

10. An electronic device comprising:
    non-volatile machine-readable storage having stored therein a plurality of update agents executable to cause processing of an associated type of update information for updating at least one of: firmware and software in the electronic device; and
    an update application loader resident in the non-volatile machine-readable storage, the loader executable to cause the device to invoke an update agent associated with update information resident in the non-volatile machine-readable storage, before operation of the device commences.

11. The device according to claim 10, wherein invocation comprises:
    selecting an update agent based upon at least one mapping stored in the electronic device, the at least one mapping comprising an association of a type of update information with an update agent; and
    causing execution of the selected update agent.

12. The device according to claim 11, wherein selecting comprises:
    prompting a user by identifying update information present in the electronic device; and
    receiving input from a user, corresponding to identified update information.

13. The device according to claim 10, wherein the device comprises a wireless mobile device.

14. The device according to claim 13, wherein the wireless mobile device comprises a cellular phone.

15. The device according to claim 10, wherein the device performs a security check to determine whether the invoked update agent is permitted to update the non-volatile machine-readable storage.

16. The device according to claim 10, wherein update information resident in the non-volatile machine-readable storage is processed without communication with an external device.

17. The device according to claim 10, wherein the associated update agent is present in the device before receipt of the update information by the device.

18. The device according to claim 10, wherein update information is processed after receipt without requiring communication of the associated update agent to the device.

19. The device according to claim 10, wherein updating information comprises an update package.

20. A mobile handset comprising:
an interface for communication via a wireless network;
non-volatile machine-readable storage containing executable code comprising a plurality of update agents for updating at least one of firmware and software in the handset, each of the update agents associated with a type of update information received via the wireless network;
at least one processor communicatively coupled to the non-volatile storage and the interface; and
wherein selection of an update agent for processing of update information is based upon the associated type of the update information.

21. The handset according to claim 20, wherein the wireless network is a cellular network.

22. The handset according to claim 20, wherein the update is performed following selection of the update agent associated with the received update information, without requiring further communication via the interface.

23. The handset according to claim 20, wherein the update information comprises a set of executable instructions for transforming a first code version to a second code version.

24. The handset according to claim 20, wherein the selection of an update agent is based upon input from a user.

25. The handset according to claim 20, wherein the update is performed following one of a reset and a boot and before the handset commences normal operation.

26. The handset according to claim 20, wherein the update information comprises an update package.

* * * * *

UNITED STATES PATENT AND TRADEMARK OFFICE
CERTIFICATE OF CORRECTION

PATENT NO. : 7,739,486 B2  Page 1 of 1
APPLICATION NO. : 11/083596
DATED : June 15, 2010
INVENTOR(S) : Bindu Rama Rao It is certified that error appears in the above-identified patent and that said Letters Patent is hereby corrected as shown below:

In column 1, line 62, before "DESCRIPTION" insert -- BRIEF --.

Signed and Sealed this

Seventh Day of September, 2010

David J. Kappos
*Director of the United States Patent and Trademark Office*